US011221889B2

(12) United States Patent
Chiu

(10) Patent No.: US 11,221,889 B2
(45) Date of Patent: Jan. 11, 2022

(54) METHOD OF DEPLOYING CLOUD SERVICES QUICKLY

(71) Applicant: NEXCOM Intelligent Systems CO., LTD., New Taipei (TW)

(72) Inventor: Yu-Chin Chiu, New Taipei (TW)

(73) Assignee: NEXCOM INTELLIGENT SYSTEMS CO., LTD., New Taipei (TW)

( * ) Notice: Subject to any disclaimer, the term of this patent is extended or adjusted under 35 U.S.C. 154(b) by 186 days.

(21) Appl. No.: 16/828,388

(22) Filed: Mar. 24, 2020

(65) Prior Publication Data
US 2021/0303364 A1    Sep. 30, 2021

(51) Int. Cl.
| G06F 9/50 | (2006.01) |
| G06F 9/48 | (2006.01) |
| G06F 9/54 | (2006.01) |
| G16Y 30/00 | (2020.01) |
| H04L 29/08 | (2006.01) |
| H04L 29/06 | (2006.01) |
| G06F 9/455 | (2018.01) |

(52) U.S. Cl.
CPC ........ *G06F 9/5072* (2013.01); *G06F 9/45558* (2013.01); *G06F 9/4881* (2013.01); *G06F 9/5066* (2013.01); *G06F 9/547* (2013.01); *G16Y 30/00* (2020.01); *H04L 67/1095* (2013.01); *H04L 67/40* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| 9,641,599 | B2 * | 5/2017 | Wesley | G06F 9/452 |
| 9,716,634 | B2 * | 7/2017 | Sapuram | G06Q 30/0631 |
| 9,813,318 | B2 * | 11/2017 | Iyoob | H04L 41/5054 |
| 10,133,608 | B2 * | 11/2018 | Sapuram | H04L 41/50 |
| 10,210,567 | B2 * | 2/2019 | Mick | G06F 9/06 |
| 10,218,778 | B2 * | 2/2019 | Wesley | H04L 67/06 |
| 10,346,775 | B1 * | 7/2019 | Xu | G06Q 10/06315 |
| 11,016,935 | B2 * | 5/2021 | Pandey | G06F 9/50 |
| 2019/0005576 | A1 * | 1/2019 | Mick | H04L 43/0817 |

OTHER PUBLICATIONS

Ferreira et al. "Cloud Services", 2013 IEEE, pp. 59-64.*
Saxena et al. "Cloud computing challenges and implementations", 2016 IEEE, pp. 2583-2588.*
Hanna et al. "The Cloud: Requirements for a Better Service", 2012 IEEE, pp. 787-792.*

* cited by examiner

*Primary Examiner* — Van H Nguyen
(74) *Attorney, Agent, or Firm* — Chun-Ming Shih; HDLS IPR Services

(57) ABSTRACT

A method of deploying cloud services quickly is to make a near-end apparatus be connected to a cloud virtual machine of a cloud server, establish a cloud agent module in the cloud virtual machine, continuously synchronize local data from the near-end apparatus to the cloud virtual machine and converse the local data into cloud structured data, upload local data flow task from the near-end apparatus to the cloud virtual machine for configuring cloud task program. A cloud execution result based on the cloud task program and the cloud structured data corresponds to a local execution result based on the local data and the local data flow task.

14 Claims, 11 Drawing Sheets

METHOD OF DEPLOYING CLOUD SERVICES QUICKLY

BACKGROUND OF THE INVENTION

Field of the Invention

The technical field relates to cloud services, and more particularly related to a method of deploying cloud services.

Description of Related Art

Each of the conventional IoT (Internet of Things) systems is usually composed of a management apparatus, a gateway and a plurality of local apparatus. The local apparatus is connected to the gateway and configured to obtain data flow (such as sensing data). The management apparatus may connect to the gateway by the internal network, such as LAN (Local Area Network) or enterprise private network.

When the administrator would like to monitor the local apparatus, the administrator may operate the management apparatus to connect to the gateway by the above-mentioned internal network, and view the operating status of the local apparatus and content of the data flow for assisting the administrator to monitor and manage the local apparatus.

The conventional IoT systems are unable to implement the remote monitoring function caused by being built in the internal network. The above status makes the administrator must go to the locations of the IoT systems for monitoring and managing, which is quite inconvenient.

SUMMARY OF THE INVENTION

The disclosure is directed to a method of deploying cloud services quickly, having the ability to provide the user to conveniently and quickly deploy the service in the near-end apparatus to the cloud server without complex operations and settings.

One of the exemplary embodiments, a method for deploying local service of a near-end apparatus in a cloud server comprises following steps: at the near-end apparatus, connecting to a cloud virtual machine of the cloud server based on connection information of the cloud virtual machine; building a cloud agent module in the cloud virtual machine; making the near-end apparatus establish a cloud synchronization connection with the cloud virtual machine, and continuously synchronizing local data in the near-end apparatus to the cloud virtual machine by the cloud synchronization connection; at the cloud virtual machine, transforming the local data into cloud structured data by the cloud agent module; uploading at least one local data flow task in the near-end apparatus to the cloud virtual machine; and at the cloud virtual machine, setting at least one cloud task program based on the at least one local data flow task by the cloud agent module, wherein a cloud execution result generated based on the at least one cloud task program and the cloud structured data corresponds to a local execution result generated based on the local data and the at least one local data flow task.

The present disclosed example can quickly and effectively deploy the service in the near-end apparatus to the cloud server, and can be suitable for the different cloud service providers.

BRIEF DESCRIPTION OF DRAWINGS

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
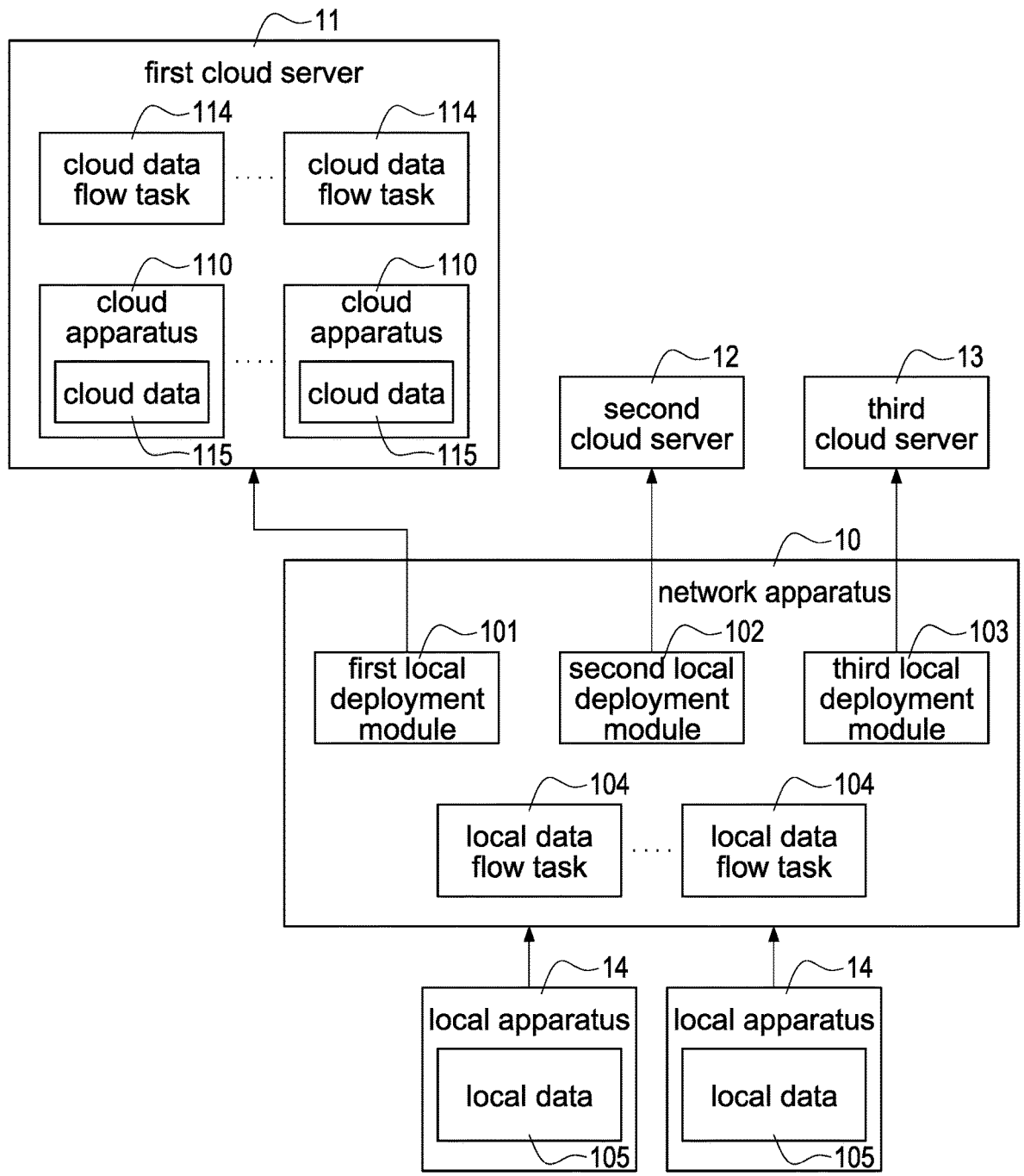
FIG. 1 illustrates an architecture diagram of the IoT system having the ability of cloud service according to one implement aspect of the present disclosed example.

Please refer to FIG. 1 which illustrates an architecture diagram of the IoT system having the ability of cloud service according to one implement aspect of the present disclosed example. The present disclosed example discloses an IoT system having the ability of cloud service. The IoT system may automatically deploy the local service in the network apparatus 10 to the cloud server (such as the first cloud server 11, the second cloud server 12 or the third cloud server 13), and the administrator may monitor and manage the near-end apparatus by the cloud server remotely.

The first cloud server 11, the second cloud server 12 and the third cloud server 13 may be the servers respectively provided by the different cloud service providers, such as Microsoft Azure, Amazon Web Service, and Google Cloud Platform. The first local deployment module 101, the second local deployment module 102 and the third local deployment module 103 are respectively used to communicate with the first cloud server 11, the second cloud server 12 and the third cloud server 13 respectively provided by the different cloud service providers.

The network apparatus 10 stores a plurality of local data flow tasks 104, and may obtain a plurality of local data 105 from the different local apparatuses 14 by an internal network. Each local data flow task 104 is used to implement the different data service. More specifically, each local data flow task 104 is used to process one or more designated local data 105 for generating an execution result for the corresponding data service.

Please refer to the IoT system shown in FIG. 1, when the user would like to cloudify the local service, the user must build the local deployment module (such as the first local deployment module 101, the second local deployment module 102 and the third local deployment module 103) in the network apparatus 10.

Take deploying the service provided by the first local deployment module 101 to the first cloud server 11 for example, the network apparatus 10 may build a plurality of cloud apparatuses 110 for simulating the local apparatuses 14 in the first cloud server 11. The cloud server 110 keeps in synchronization with the local apparatus 14. Namely the cloud data 115 stored in the cloud server 110 is the same as the local data 105 provided by the local apparatus 14. Moreover, the network apparatus 10 may further build on the first cloud server 11 a plurality of cloud data flow tasks 114 same as a plurality of local data flow tasks 104.

Thus, the user can directly operate computer to connect to the first cloud server 11 by the internet for executing the above-mentioned data service without connecting the network apparatus 10 via the internal network. Moreover, because the cloud data 115 of the cloud apparatus 110 is kept in synchronization with the local data 105, the cloud execution result obtained by the first cloud server 11 is the same as the local execution result.

However, because the different transmission protocols are applied respectively by the different cloud service providers, the above-mentioned local deployment module is deplored based on the transmission protocol applied by the selected cloud service provider (such as Microsoft Azure), and is only suitable to this cloud service provider. Once the user replaces the current vendor with a new one (such as Amazon Web Service), the user must deploy a new local deployment module based on a new transmission protocol applied by the new cloud service provider. The above status increases the cost of research and deployment, and puts off the time of the cloud service being online.

Moreover, the cloud server will transformer the received data into data with a specific structure used by the cloud service provider. Thus, for processing the data (such as generating cloud execution result), only the cloud programs (such as the program to simulate the cloud apparatus 110) deployed by the deployment tools (such as API) provided by the cloud service provider can be run in the execution environment provided by the same cloud service provider. However, because the different cloud service providers use the different specific structures respectively, and the user must redeploy the cloud program for the new cloud service provider when replacing with the new cloud service provider. The above status increases the cost of research and deployment, and puts off the time of the cloud service being online.

Figure 2:
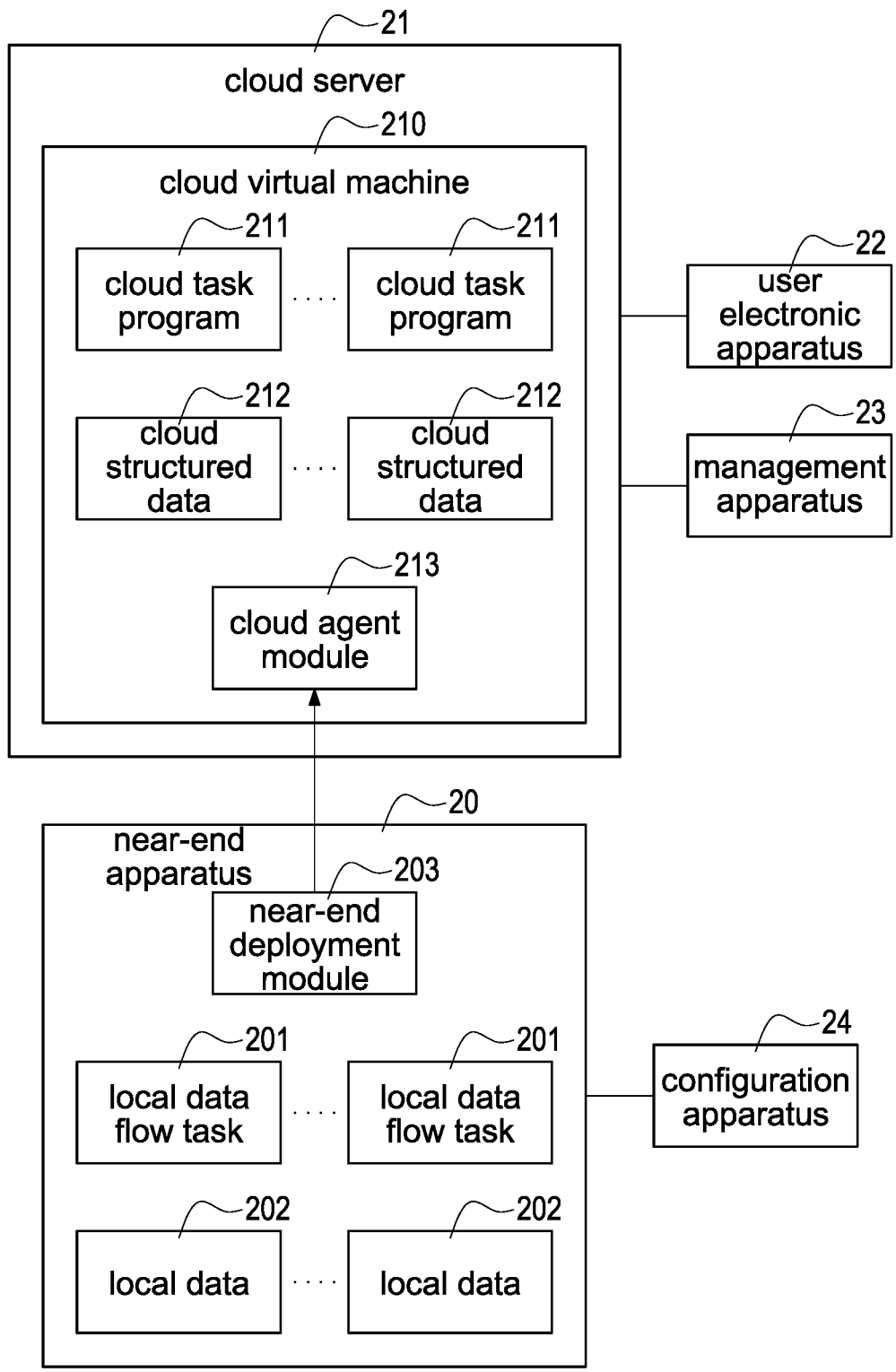
FIG. 2 illustrates an architecture diagram of the IoT system having the ability of cloud service according to a first implement aspect of the present disclosed example.
Figure 7:
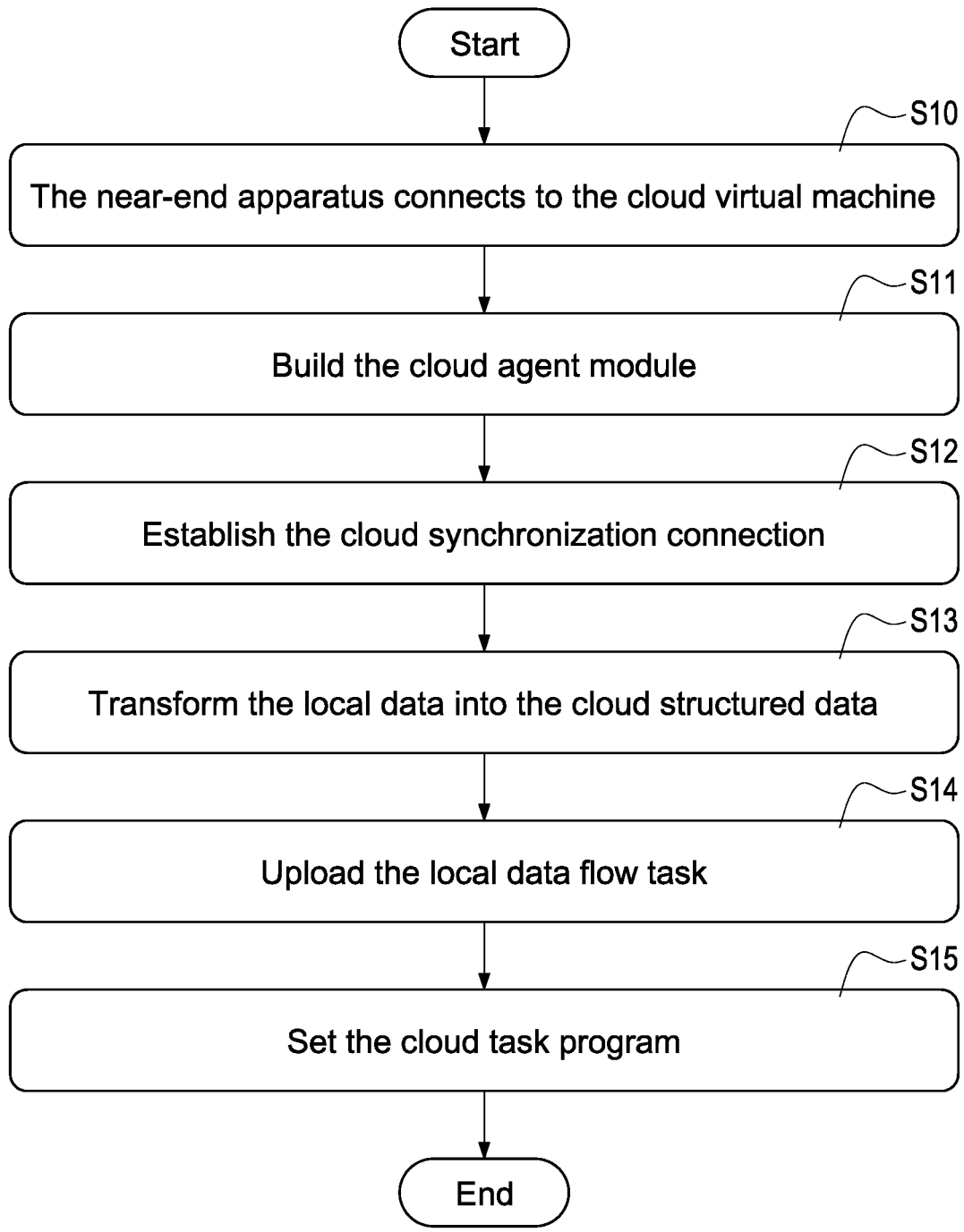
FIG. 7 illustrates a flowchart of the method of deploying cloud services quickly according to a first embodiment of the present disclosed example.

Please refer to FIG. 2 and FIG. 7 together. FIG. 2 illustrates an architecture diagram of the IoT system having the ability of cloud service according to a first implement aspect of the present disclosed example, and FIG. 7 illustrates a flowchart of the method of deploying cloud services quickly according to a first embodiment of the present disclosed example.

For solving the above-mentioned problem, the present disclosed example also proposes an IoT system having the ability of cloud service (hereinafter cloud IoT system for abbreviation) and a method of deploying cloud services quickly. The cloud IoT system mainly comprises at least one near-end apparatus 20 and at least one cloud server 21. The near-end apparatus 20 is connected to the cloud server 21 by a public network (such as the internet).

The present disclosed example is mainly to make the near-end apparatus 20 directly communicate with the cloud virtual machine(s) of the cloud server 21. Because the execution environment provided by the cloud service provider is not directly used and there is no need to use the transmission protocol designated by the cloud service provider. Thus, in the present disclosed example, even the cloud service provider is replaced with the new one, there is no need to redeploy the near-end deployment module 203.

Moreover, the present disclosed example further provides an execution environment by the cloud virtual machine 210. Because the specification of the cloud virtual machine 210 is determined by the user's configurations, the user can create the cloud virtual machine 210 with the same specification in the cloud servers of the different cloud service providers. Thus, in the present disclosed example, even the current cloud service provider is changed to another one, the execution environment does not be changed, and there is no need to redeploy the cloud program.

More specifically, in the present disclosed example, the cloud server 21 can provide the deployed cloud service by the internet after the cloud service deployment is done.

The near-end deployment module 203 is arranged in the near-end apparatus 20, and the near-end apparatus 20 can retrieve a plurality of local data flow tasks 201 and a plurality of local data 202 (such as loading from the built-in memory or receiving from outside).

Before the user starts to deploy the cloud service, the user must operate the user electronic apparatus 22, such as smartphone, tablet, notebook, personal computer and so forth, to connect to the cloud server 21 by the internet, and build a cloud virtual machine 210 in this cloud server 21. The above cloud virtual machine 210 is used to execute the deployed cloud service. The above-mentioned technology of building a cloud virtual machine 210 in the cloud server 21 is the existing technology in the art of the present disclosed example, the relevant description of the detail options is omitted for brevity.

Then, the near-end apparatus 20 and the cloud server 21 may execute following steps to deploy the cloud service quickly.

Step S10: the near-end apparatus 20 is connected to the cloud virtual machine 210 of the cloud server 21 by the public network, such as the internet.

More specifically, the user can obtain connection information of the cloud virtual machine after creating the cloud virtual machine 210. The above-mentioned connection information of cloud virtual machine may comprise network address and/or connection port number of the cloud virtual machine 210, or the identification information (such as name or alias) and/or key (such as SSH public key) of the cloud virtual machine 21, but this specific example is not intended to limit the scope of the present disclosed example.

Then, the user may operate the near-end apparatus 20 and key in the obtained connection information of cloud virtual machine for making the near-end apparatus 20 establish the network connection with the cloud virtual machine 210 of the cloud server 21 by the public network based on the connection information of cloud virtual machine.

One of the exemplary embodiments, the user may operate the configuration apparatus 24 (such as smartphone, tablet, laptop or personal computer, etc.) to connect to the near-end apparatus 20 by the internal network (such as Local Area Network, LAN) for operating the near-end apparatus 20.

Step S11: the near-end apparatus 20 builds the cloud agent module 213 in the cloud virtual machine 210.

One of the exemplary embodiments, the cloud agent module 213 is a software module, the near-end apparatus 20 uploads an installation program of the cloud agent module 213 to the cloud virtual machine 210, installs the installation program for installing the cloud agent module 213 in the cloud virtual machine 210, and executes an initial configuration on the cloud agent module 213, but this specific example is not intended to limit the scope of the present disclosed example.

One of the exemplary embodiments, the user may in make the c loud virtual machine 210 be installed in the cloud virtual machine 210 in advance when creating the cloud virtual machine 210.

One of the exemplary embodiments, the cloud agent module 213 is the studio software module. When the cloud agent module 213 is running, an execution environment is provided for deploying programs.

Step S12: the near-end apparatus 20 establishes a cloud synchronization connection with the cloud virtual machine 210 of the cloud server 21, and synchronizes the local data 202 of the near-end apparatus 20 to the cloud virtual machine 210 by the established synchronization connection continuously.

One of the exemplary embodiments, the near-end apparatus 20 sends the newest local data 202 (or sending only the content being modified) to the cloud virtual machine 210 by the synchronization connection when a synchronization condition is fulfilled. The above-mentioned synchronization condition may be a designated time period elapsing (such as 5 minutes) easel, a designated status is coming or a manual trigger occurring (such as receiving a synchronization command), but this specific example is not intended to limit the scope of the present disclosed example. Thus, the cloud virtual machine 210 may retrieve the newest local data 202 each time the synchronization is done.

One of the exemplary embodiments, the near-end apparatus 20 may retrieve a plurality of local data 202 being from the difference source or with the different types, select a part of the local data 202 based on operations or configurations of the user, and update the local data 202 being selected to the cloud virtual machine 210 for synchronization.

One of the exemplary embodiments, the near-end apparatus 20 comprises at least one of network apparatus and at least one of local apparatus. The above-mentioned network apparatus and local apparatus may be integrated with the same case, or be arranged in different places and connected to each other by the internal network. Moreover, the above-mentioned local data flow task 201 is stored in the network apparatus, and the local data 202 is stored in the local apparatus.

One of the exemplary embodiments, the cloud agent module 213 is configured to provide web service for data transmission to the near-end apparatus 20, such as transmitting data based on HTTP, URI or the other data transmission technology. Thus, the present disclosed example can achieve data transmission between the different programs or the different execution environments.

One of the exemplary embodiments, the cloud agent module 213 provides the above-mentioned web service by RESTful API. In other words, the above-mentioned web service may be implemented by RESTful API (REpresentational State Transfer Application Program Interface).

Step S13: the cloud virtual machine 210 transforms the local data 202 being received into the cloud structured data 212 by the cloud agent module 213.

Please be noted that, in the embodiment shown in FIG. 1, the way to create a virtual cloud apparatus 110 in the first cloud server 11 to store the cloud data 115 for simulating the behavior of the local apparatus 14 storing local data 105 will use a lot of computation resources. In this embodiment, the present disclosed example is to execute a structured process on each local data 202 being received for obtaining the corresponding cloud structured data 212. The above-mentioned cloud structured data 212 may be used to represent the hardware information related to the local data 202, such as name, address or hardware type or the other information of the near-end apparatus 20 (or the local apparatus) providing the local data 202. Thus, by the structured process, this embodiment can transform the above-mentioned behavior of simulation into the simple behavior of data access, and save the computation resources substantially.

Step S14: the near-end apparatus 20 uploads the local data flow task 201 to the cloud virtual machine 210.

One of the exemplary embodiments, the near-end apparatus 20 may select partial local data flow task 201 based on the operations or configurations of the user, and upload only the selected local data flow task 201 to the cloud virtual machine 210 for configurations.

Step S15: the cloud virtual machine 210 configures by the cloud agent module 213 the corresponding cloud task programs 211 based on the local data flow tasks 201 being received.

More specifically, the cloud agent module 213 is configured to execute a programmatic process on each local data flow task 201 for generating the corresponding cloud task program 211.

Please be noted that each local data flow task 201 is used to implement the specific function, and records one or more application rule(s) for instructing how to process the one or more local data 202. The above-mentioned programmatic process is used to generate the cloud task programs 211 for implementing the above-mentioned application rules.

On the other hand, after the cloud task program 211 is run in the cloud virtual machine 210, the cloud virtual machine 210 has the ability to execute the same process as the local data flow task 201 on the cloud structured data 212 corresponding to the local data 202. Thus, the cloud execution results generated based on the cloud task programs and the cloud structured data correspond to the local execution results generated by the local data and the local data flow tasks. For example, the cloud execution results are the same as/similar to the local execution results.

The present disclosed example can fast and effectively deploy the service original in the near-end apparatus to the cloud server, and can be suitable for the different cloud service providers.

Figure 8:
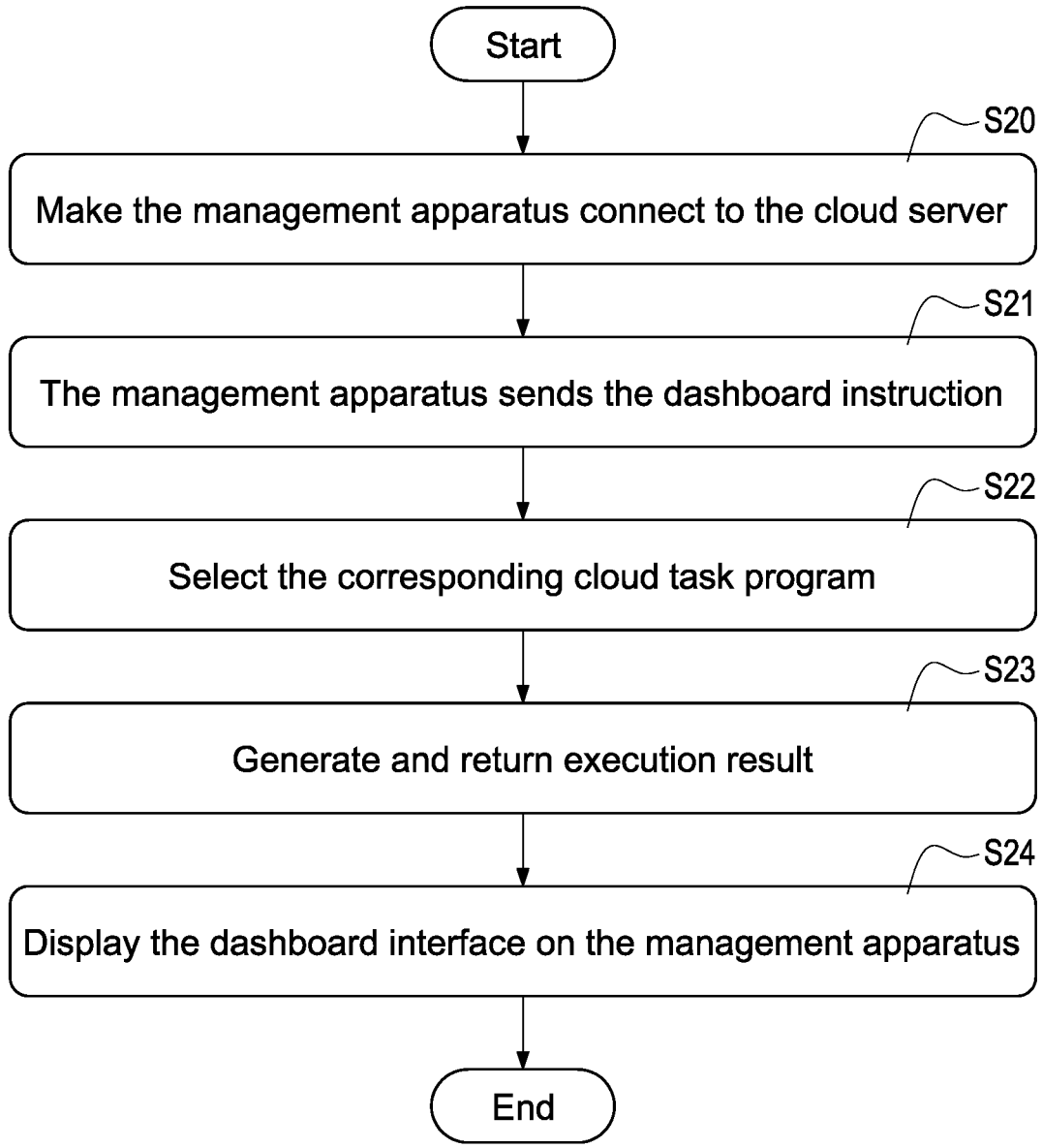
FIG. 8 illustrates a flowchart of using the cloud service according to a second embodiment of the present disclosed example.

Please refer to FIG. 8 illustrating a flowchart of using the cloud service according to a second embodiment of the present disclosed example. In comparison with the method of deploying cloud services quickly shown in FIG. 7, the method of deploying cloud services quickly of this embodiment further comprises following steps performed for providing cloud service when the deployment of cloud service is done.

Step S20: the management apparatus 23 establishes a connection with the cloud virtual machine 210 based on the operations inputted by the user.

One of the exemplary embodiments, the user may input the connection information of cloud virtual machine to the management apparatus 23, so as to make the management apparatus 23 connect to the cloud virtual machine 210 of the cloud server 21 based on the connection information of cloud virtual machine.

One of the exemplary embodiments, the user operates the management apparatus 23 to connect to the cloud virtual machine 210 by Web service, such as typing the connection information of cloud virtual machine in a web browser.

Step S21: the management apparatus 23 sends a dashboard instruction to the cloud virtual machine 210.

One of the exemplary embodiments, the management apparatus 23 may display an operation interface (such as displaying GUI in the web browser), the user may select the designated local data that the user would like to read up and/or the designated local data flow task that the user wants it to be executed. Then, the management apparatus 23 generates the corresponding dashboard instruction based on the selection operation inputted by the user, and sends the generated dashboard instruction to the c loud virtual machine 210.

One of the exemplary embodiments, the management apparatus 23 generates the dashboard instruction automatically when connecting to the cloud virtual machine 210, and send the automatically generated dashboard instruction to the cloud virtual machine 210.

One of the exemplary embodiments, the above-mentioned dashboard instruction is executed for indicating the functions that the user wants them to implement, such as showing the temperature statistics, the access control data for a designated time period and so forth. Each above-mentioned function may be implemented by one or more local data flow task(s) 201 (and/or the corresponding cloud task program(s) 211) alone or together.

Step S22: the cloud virtual machine 210 selects all or a part of the cloud task programs 211 based on the received dashboard instruction when reception of the dashboard instruction form the management apparatus.

Step S23: the cloud virtual machine 210 loads one or more cloud structured data 212 respectively associated with each selected cloud task program 211, and runs the selected cloud task programs 211 to analyze or process the cloud structured data 212 for generating each cloud execution result. Each above-mentioned cloud execution result is used to show the function designated by the dashboard instruction.

Then, the cloud virtual machine 210 may generate dashboard data based on the generated one or more cloud execution result, such as compiling or typesetting those cloud execution results for generating graphical description data, and return the dashboard data to the management apparatus 23 by the public network.

For example, if the three cloud task programs 211 are respectively used to implement an average temperature function (first cloud task program), an off-work access control function (second cloud task program) and an environment comfort function (third cloud task program), the cloud virtual machine 210 may retrieve the cloud structured data 212 associated with the first cloud task program (such as a plurality of temperature sensing data, the local data corresponding to the cloud structured data 212 may be generated by one or more temperature sensor, namely the local apparatus), retrieve the cloud structured data 212 associated with the second cloud task program (such as a plurality of access control data of humans, the local data corresponding to the cloud structured data 212 may be generated by one or more access control apparatus, namely the local apparatus), and retrieve the cloud structured data 212 associated with the third cloud task program (such as a plurality of temperature sensing data and a plurality of humidity sensing data, the local data corresponding to the cloud structured data 212 may be generated by one or more temperature sensor and one or more humidity sensor, namely the local apparatus).

Then, the cloud virtual machine 210 may execute the first cloud task program to analyze and process the plurality of temperature sensing data (such as the execution of average computation) for obtaining an average temperature as the first cloud execution result, execute the second cloud task program to analyze and process the plurality of access control data of humans (such as the execution of filtering process for obtaining the access control data of humans passing in and out during 7 pm to 7 am the next day) for obtaining access control data of humans passing in or out the access control apparatus after work hours as the second cloud execution result, and execute the third cloud task program to analyze and process the plurality of temperature sensing data and the plurality of humidity sensing data (such as the execution of comfort computation) for obtaining a comfort index as the third cloud execution result.

Finally, the cloud virtual machine 210 may transform the first cloud execution result, the second cloud execution result and the third cloud execution result being generated into the text data and/or graphic data (such as drawing a dashboard based on the data) as the dashboard data.

Please be noted that there are local data flow tasks 201 corresponding to each cloud task program 211 and local data 202 corresponding to the cloud structured data 212 being stored in the near-end apparatus 20.

The local execution results obtained by the near-end apparatus 20 executing the local data flow tasks 201 for analysis and process are respectively the same as/similar to the above-mentioned cloud execution results, such as the same average temperature, the same access control data of humans and the same comfort index.

Step S24: the management apparatus 23 renders a dashboard interface based on the received dashboard data, and displays the dashboard interface on the display device. The above-mentioned dashboard interface is used to show the above-mentioned cloud execution results.

Thus, when the deployment of the cloud service is done, the user has the ability to use the service same as the local service in the cloud by the management apparatus, and there is no need to visit the place that the near-end apparatus is arranged at.

Figure 9:
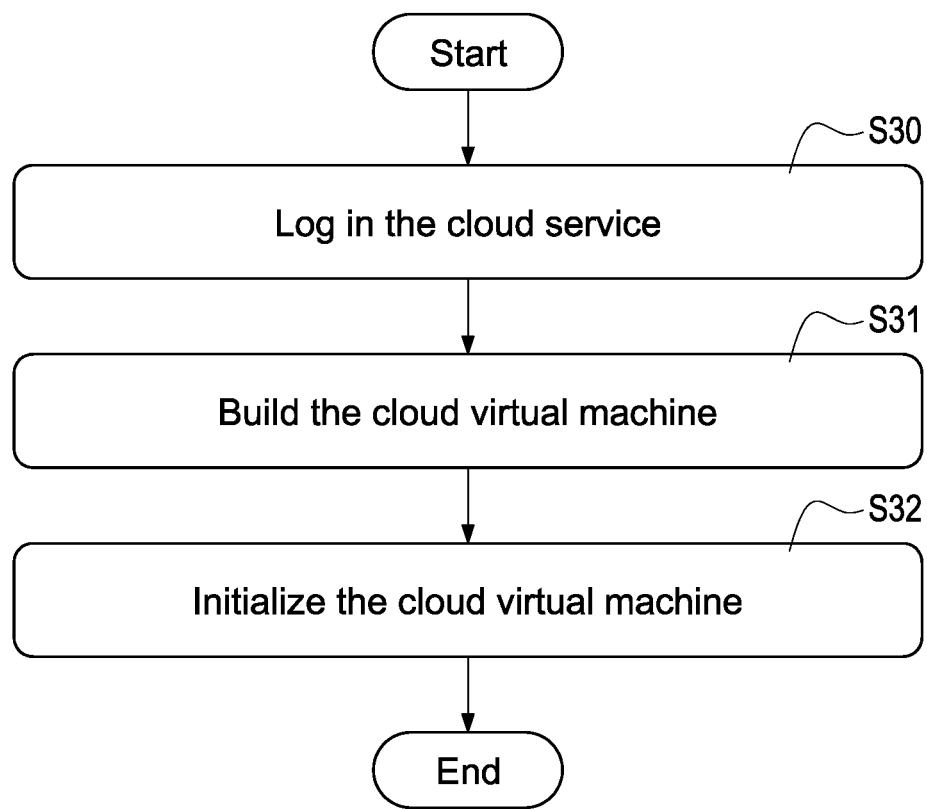
FIG. 9 illustrates a flowchart of building the cloud virtual machine according to a third embodiment of the present disclosed example.

Please refer to FIG. 9 illustrating a flowchart of building the cloud virtual machine according to a third embodiment of the present disclosed example. In comparison with the method of deploying cloud services quickly shown in FIG. 7, the method of deploying cloud services quickly of this embodiment further comprises the following steps used to create the cloud virtual machine before starting to deploy the cloud service corresponding to local service.

Step S30: the user may operate a user electronic apparatus 22 to connect to the cloud server 21 by the public network, and type the user identification information (such as account and password) to log in the cloud service for enabling the management interface of the cloud service.

Step S31: the user may create in the c loud server 21 the cloud virtual machine 210 associated with the user by the management interface.

Step S32: the user may initialize and set the cloud virtual machine 210, and retrieve the connection information of the cloud virtual machine.

One of the exemplary embodiments, the above-mentioned configuration of initializing and setting may comprise setting the execution environment of the cloud virtual machine 210, such as the version of the operating system, the volume of random-access memory (RAM), the volume of non-volatile storage space, etc.

Please be noted that the user may respectively create the cloud virtual machines with the same execution environment in the cloud services of the different cloud service providers because the execution environment of the cloud virtual machine 210 is configurable and customizable by the user.

Thus, when the user would like to change the cloud service provider to provide the same cloud service, the cloud agent module 213 and the near-end deployment module 203 can be directly used on the cloud server of the new cloud service provider (maybe only the connection information of cloud virtual machine need to be modified) because the execution environment does not be changed. and there is no need to redevelop the new program for the new cloud service provider.

Figure 10:
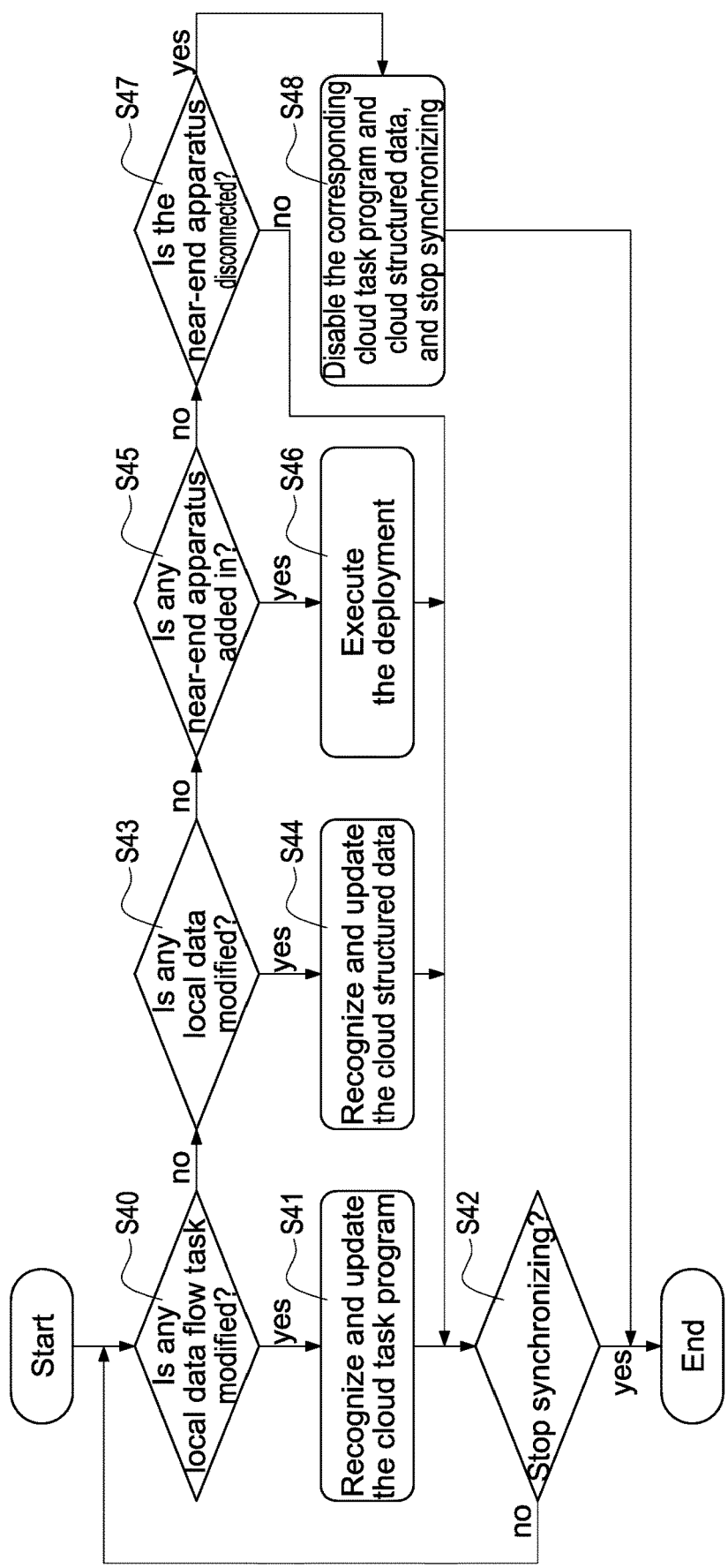
FIG. 10 illustrates a flowchart of the synchronization process according to a fourth embodiment of the present disclosed example.

Please refer to FIG. 10 illustrating a flowchart of the synchronization process according to a fourth embodiment of the present disclosed example. In comparison with the method of deploying cloud services quickly shown in FIG. 7, the method of deploying cloud services quickly of this embodiment further comprises the following steps S40-S48 used to provide a synchronization service after the deployment of cloud service is done.

The method of deploying cloud services quickly of this embodiment can implement at least a synchronization function of local data flow task, a synchronization function of local data and a synchronization function of near-end apparatus (may comprise a synchronization function of adding near-end apparatus and a synchronization function of disabling near-end apparatus).

More specifically, the synchronization function of local data flow task is achieved by performing the following steps.

Step S40: the near-end apparatus 20 detects whether any local data flow task 201 is modified.

If any local data flow task 201 is modified, the near-end apparatus 20 uploads the local data flow task being modified to the cloud virtual machine 210 by the public network, and performs the step S41.

One of the exemplary embodiments, the cloud task program 211 and the cloud structured data 212 corresponding to the near-end apparatus 20 are associated with the identification information of near-end apparatus belonging to the same near-end apparatus 20. The near-end apparatus 20 may further upload the identification information of near-end apparatus belonging to this near-end apparatus 20 to the cloud virtual machine 210 for recognition, such as MAC address, apparatus name, network address and so forth.

If all of the local data flow tasks 201 do not be modified, the near-end apparatus performs the other detection (such as step S43).

Step S41: the cloud virtual machine 210 may recognize by the cloud agent module 213 the corresponding cloud task program 211 based on the received identification information of near-end apparatus, and update the corresponding cloud task program 211 according to the modified local data flow task 201.

One of the exemplary embodiments, the cloud virtual machine 210 may set a new cloud task program 211 according to the modified local data flow task 201, and replace the original cloud task program 211 with the new cloud task program 211.

For Example, if the user modifies the content of any local data flow task 201 in the near-end apparatus 20, the cloud virtual machine 210 may modify the local data flow task corresponding to the modified local data flow task 201 simultaneously. If the user adds the new local data flow task 201 in the near-end apparatus 20, the cloud virtual machine 210 may add the cloud task program 211 corresponding to the added local data flow task 201 simultaneously. If the user deletes any existing local data flow task 201 in the near-end apparatus 20, the cloud virtual machine 210 may delete or disable the cloud task program 211 corresponding to the deleted local data flow task 201 simultaneously.

Step S42: the near-end apparatus 20 and the cloud virtual machine 210 determine whether the synchronization is stopped, such as the user disabling the synchronization function, or the synchronization connection between the near-end apparatus 20 and the cloud virtual machine 210 is disconnected.

If the determination is that stopping synchronization, the process will be terminated. Otherwise, the near-end apparatus 20 and the cloud virtual machine 210 execute the synchronization function again, such as jumping to the step S40 for performing again.

The synchronization function of local data is achieved by performing the following steps.

Step S43: the near-end apparatus 20 detects whether any local data 202 is changed.

If the local data 202 is modified, the near-end apparatus 20 uploads the modified local data 202 by the cloud synchronization connection established in advance to the cloud virtual machine 210, and executes the step S44.

One of the exemplary embodiments, the near-end apparatus 20 further uploads the identification information of near-end apparatus belonging to the near-end apparatus 20 to the cloud virtual machine 210.

If the local data 202 is not changed, the other detection is executed (such as step S45).

Step S44: the cloud virtual machine 210 may recognize by the cloud agent module 213 the cloud structured data 212 associated with the identification information of near-end apparatus based on the received identification information of near-end apparatus, and update the recognized cloud structured data 212 based on the changed local data 202. Then, the cloud virtual machine 210 and the near-end apparatus 20 may perform step S42.

One of the exemplary embodiments, the cloud virtual machine 210 may transform the modified local data 202 into the new cloud structured data 212, and replace the original cloud structured data 212 with the new cloud structured data 212 directly.

For Example, if the user modifies the content of any local data 202 in the near-end apparatus 20, the cloud virtual machine 210 may modify the cloud structured data 212 corresponding to the modified local data 202 simultaneously. If the user adds the new local data 202 in the near-end apparatus 20, the cloud virtual machine 210 may add the new cloud structured data 212 corresponding the added local data 202 simultaneously. If the user deletes the existing local data 202 in the near-end apparatus 20, the cloud virtual machine 210 may delete or disable the cloud structured data corresponding to the deleted local data 202 simultaneously.

The synchronization function of adding near-end apparatus is achieved by performing the following steps.

Step S45: the cloud virtual machine 210 may determine whether any new near-end apparatus 20 is connected (hereinafter incremental near-end apparatus for abbreviation).

If the cloud virtual machine 20 is connected to the incremental near-end apparatus, the step S46 is performed. Otherwise, the cloud virtual machine 210 executes the other detection (such as step S47).

Step S46: the cloud virtual machine 210 and the incremental near-end apparatus execute deployment process for deploying the service of the incremental near-end apparatus to the cloud virtual machine 210. Then, the cloud virtual machine 210 and the near-end apparatus 20 may perform the step S42.

The above-mentioned deployment process may be the execution of steps S10-S15 shown in FIG. 7. For example, the incremental near-end apparatus may connect to the cloud virtual machine 210, set the cloud agent module 213 (such as registering the information related to the incremental near-end apparatus), establish the synchronization connection with the cloud virtual machine 210 (hereinafter incremental synchronization connection for abbreviation), and synchronize the local data of the near-end apparatus (hereinafter incremental local data for abbreviation) to the cloud virtual machine 210 continuously by the incremental synchronization connection. Then, the cloud virtual machine 210 may transform by the cloud agent module 213 the received incremental local data into the cloud structured data (hereinafter the incremental cloud structured data for abbreviation).

Moreover, the incremental near-end apparatus may further upload the local data flow task (hereinafter incremental local data flow task for abbreviation) to the cloud virtual machine 210. The cloud virtual machine 210 may set the cloud task programs (incremental cloud task programs) based on the received incremental local data flow tasks one by one. The above-mentioned incremental cloud execution results generated based on the incremental cloud task program and the incremental cloud structured data correspond to the incremental local execution results based on the incremental local data flow tasks and the incremental local data. Moreover, each incremental cloud structured data and each incremental cloud task program are associated with the identification information of incremental near-end apparatus belonging to the incremental near-end apparatus.

Thus, the present disclosed example can deploy the service provided by the incremental near-end apparatus to the cloud.

The synchronization function of disabling near-end apparatus is achieved by performing the following steps.

Step S47: the cloud virtual machine 210 determines whether any near-end apparatus 20 had connected in the past is disconnected.

If any near-end apparatus 20 had connected in the past is disconnected, the cloud virtual machine 210 performs the step S48. Otherwise, the cloud virtual machine 210 performs step S42.

Step S48: the cloud structured data 210 recognizes cloud structured data 212 and cloud task program(s) 211 associated with the near-end apparatus 20 based on the identification information of the near-end apparatus belonging to the disconnected near-end apparatus 20, disconnects the established cloud synchronization connection, and disables all of the cloud structured data 212 and cloud task program 211 corresponding to the disconnected near-end apparatus 20.

Then, the cloud virtual machine 210 and the near-end apparatus 20 may perform step S42.

Thus. the present disclosed example can effectively implement the synchronization functions.

Figure 3:
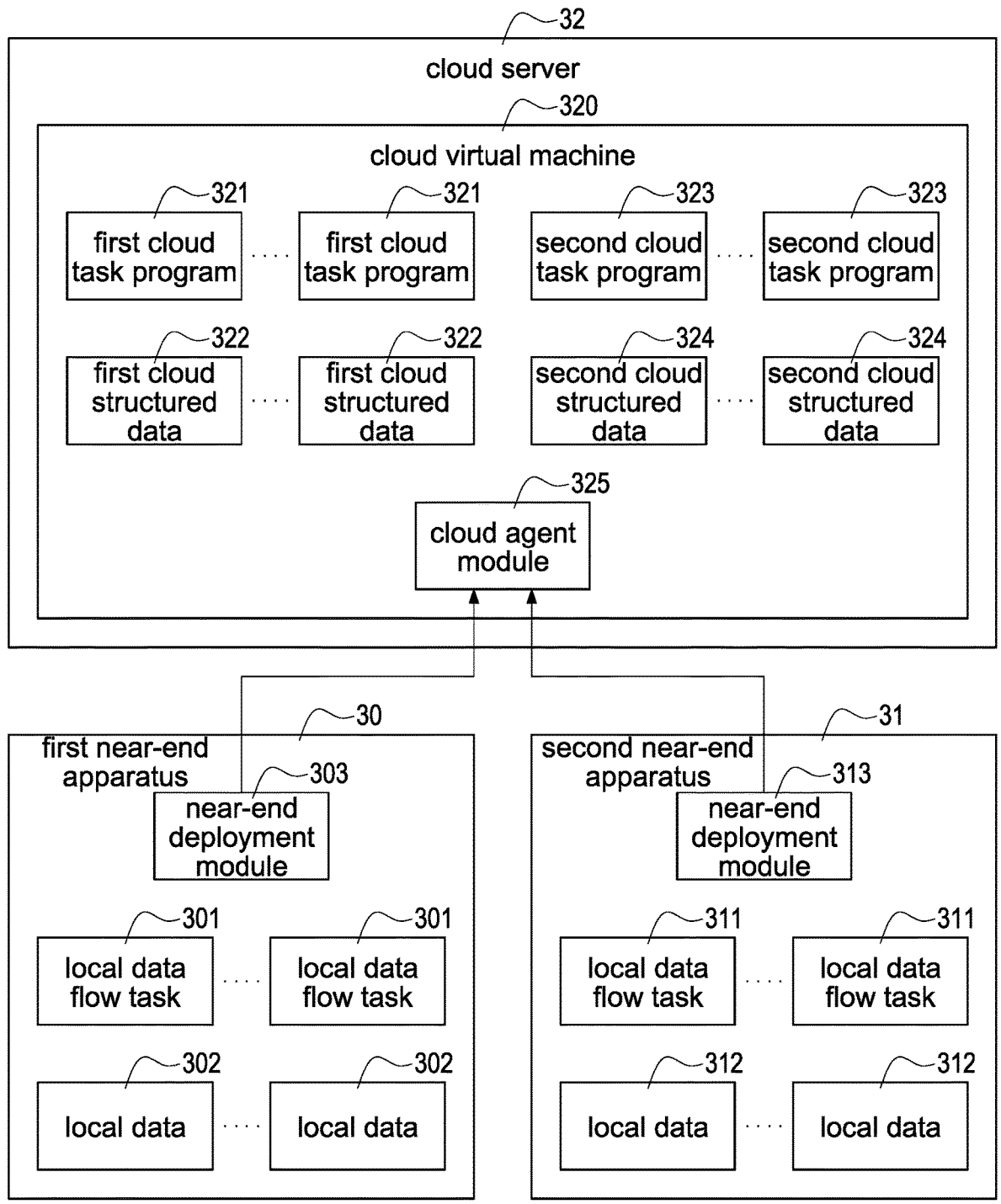
FIG. 3 illustrates an architecture diagram of the IoT system having the ability of cloud service according to a second implement aspect of the present disclosed example.

Please refer to FIG. 3 illustrating an architecture diagram of the IoT system having the ability of cloud service according to a second implement aspect of the present disclosed example. The following is used to explain how the cloud virtual machine 320 of the cloud server 32 of the present disclosed example provides the cloud services of a plurality of near-end apparatuses simultaneously without error when connecting to a plurality of near-end apparatus simultaneously (take first near-end apparatus 30 and the second near-end apparatus 31 for example in FIG. 3).

More specifically, the first near-end apparatus 30 may execute the cloud deployment process by the near-end deployment module 303 and the cloud agent module 325 of the cloud virtual machine 320 for deploying the local data flow task 301 and the local data 302 to the cloud virtual machine 320 as the first cloud task program 321 and the first cloud structured data 322. The above-mentioned first cloud task program 321 and the first cloud structured data 322 are associated with the identification information of near-end apparatus belonging to the first near-end apparatus 30.

Moreover, the second near-end apparatus 30 may execute the cloud deployment process by the near-end deployment module 313 and the cloud agent module 325 of the cloud virtual machine 320 for deploying the local data flow task 311 and the local data 312 to the cloud virtual machine 320 as the second cloud task program 323 and the second cloud structured data 324. The above-mentioned second cloud task program 323 and the second cloud structured data 324 are associated with the identification information of near-end apparatus belonging to the second near-end apparatus 31.

Thus, the cloud virtual machine 320 may recognize based on the identification information of near-end apparatus which near-end apparatus the stored cloud task programs and the cloud structured data belong to when the cloud virtual machine 320 connects to a plurality of near-end apparatuses simultaneously.

Figure 4:
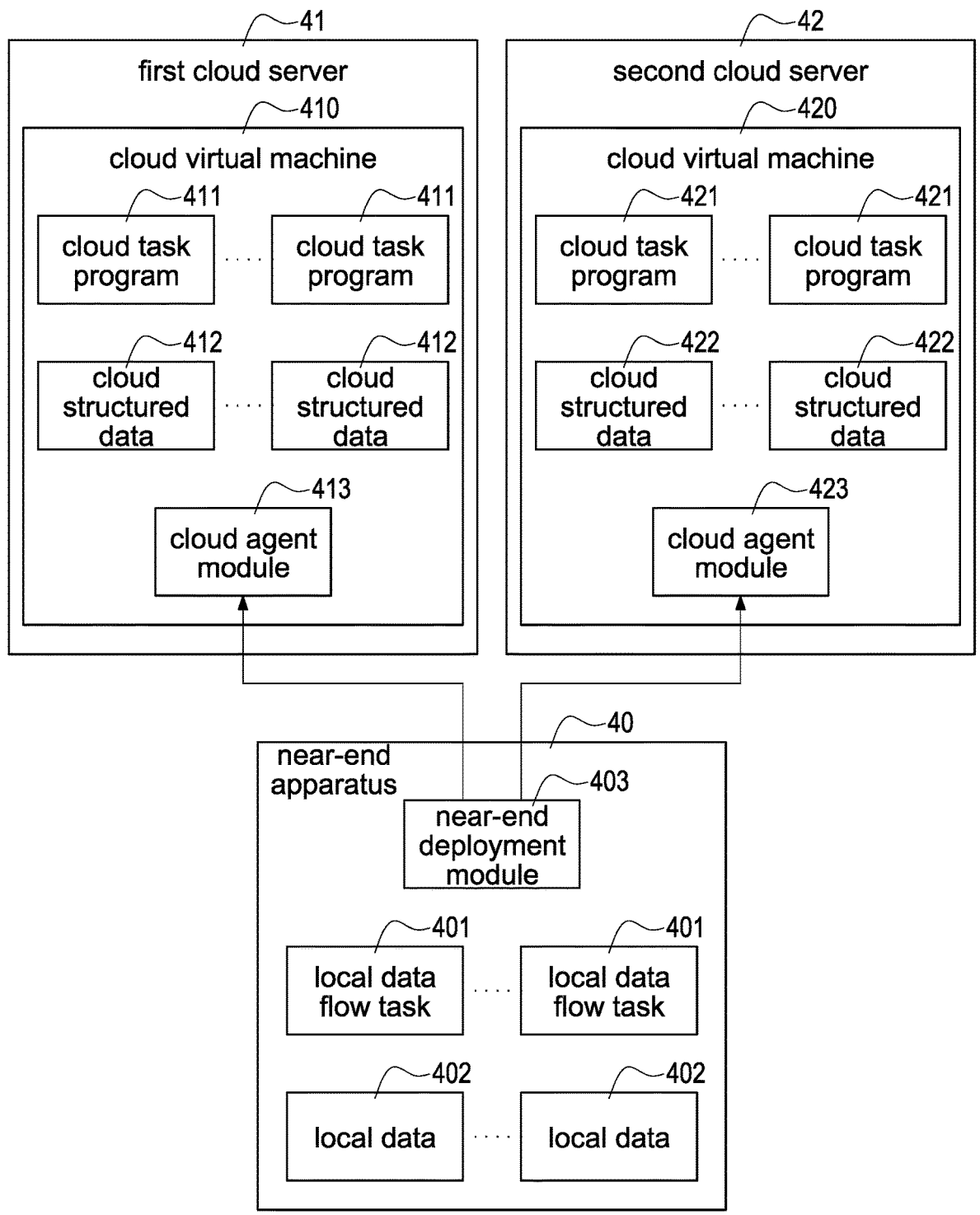
FIG. 4 illustrates an architecture diagram of the IoT system having the ability of cloud service according to a third implement aspect of the present disclosed example.

Please refer to FIG. 4 illustrating an architecture diagram of the IoT system having the ability of cloud service according to a third implement aspect of the present disclosed example. The following will explain how the IoT system of the present disclosed example achieve that changing the cloud service provider quickly.

When the user would like to move the cloud service from the first cloud server 41 of the first cloud service provider to the second cloud server 42 of the second cloud service provider, the user must create in the second cloud server 42 a cloud virtual machine 420 having the configurations same as/similar to the cloud virtual machine 410 of the first cloud server 41, so as to build the execution environment in the second server 42 same as/similar to the cloud virtual machine 410.

Then, the user may execute control the near-end deployment module 403 to run to set the cloud agent module 423, and execute deployment to deploy the local data flow tasks 401 and the local data 402 of the near-end apparatus 40 to the cloud virtual machine 420 of the second cloud server 42 for generating the cloud task programs 421 and the cloud structured data 422.

Finally, the user may set the near-end deployment module 403 of the near-end apparatus to connect to the cloud virtual machine 420 for completing the deployment.

Thus, after the simple configurations and re-deployment, the near-end apparatus 40 can synchronize the local data flow tasks 401 and the local data 402 to the new cloud virtual machine 420.

Figure 5:
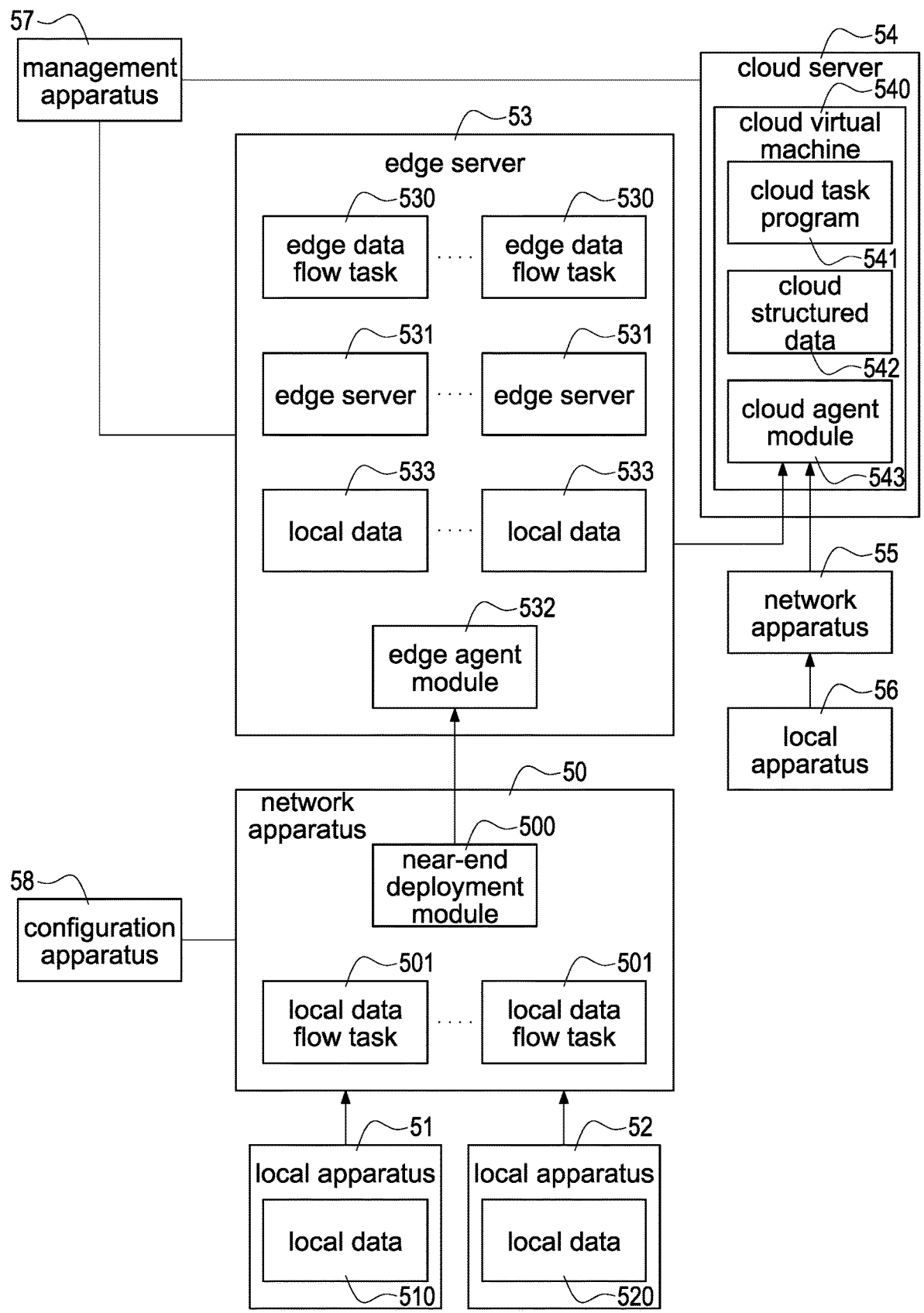
FIG. 5 illustrates an architecture diagram of the IoT system having the ability of cloud service according to a fourth implement aspect of the present disclosed example.
Figure 11:
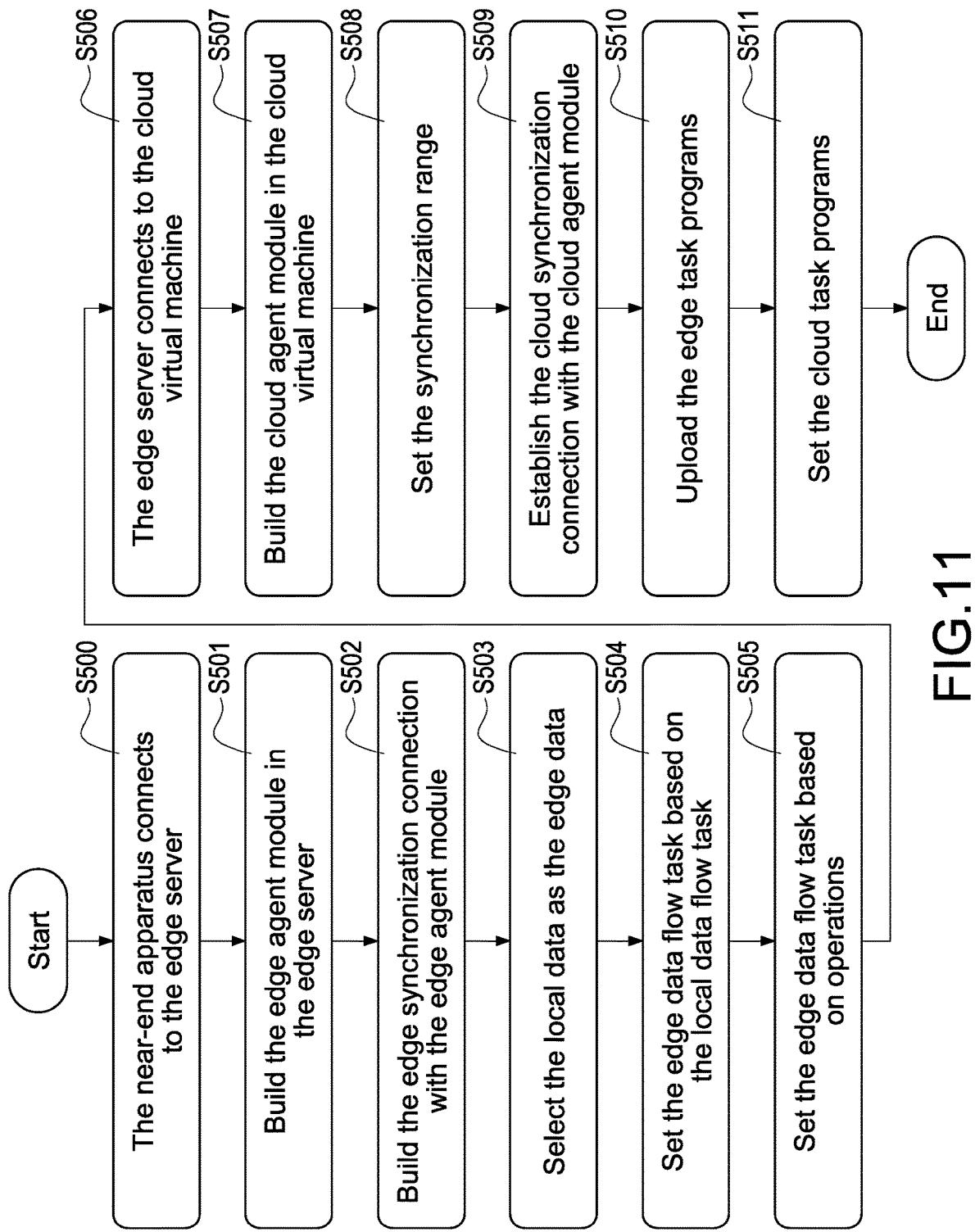
FIG. 11 illustrates a flowchart of the method of deploying cloud services quickly according to a fifth embodiment of the present disclosed example.

Please refer to FIG. 5 and FIG. 11. FIG. 5 illustrates an architecture diagram of the IoT system having the ability of cloud service according to a fourth implement aspect of the present disclosed example, and FIG. 11 illustrates a flowchart of the method of deploying cloud services quickly according to a fifth embodiment of the present disclosed example.

In the present disclosed example, the above-mentioned near-end apparatus may comprise the network apparatus and local apparatus. For example, the local apparatuses 51 and 52 may connect to the network apparatus 50 by the internal network, or the local apparatus 56 may connect to the network apparatus 55 by the internal network.

In this status, the network apparatus 50 (such as a gateway or the other IoT relay apparatus) may comprise a near-end deployment module 500 and local data flow tasks 501, the local apparatuses 51 and 52 (such as camera, sensor, output/input device or the other IoT node apparatus) are used to generate the local data 510 and 520 by themselves (such as videos, sensing data, input signals, output signals and so forth), and send the generated local data 510 and 520 to the network apparatus 50.

In the present disclosed example, the network apparatus 55 directly deploys the local service on the cloud virtual machine 5140 of the cloud server 54, so as to make the network apparatus 55 has the ability to forward the local data received from the local apparatus 56 to the cloud virtual machine 54.

Besides, one or more network apparatus 50 are configured to deploys the local service to the edge server 53 (such as gateway or the other reply server) as the edge service, and the edge server 53 deploys the edge service on the cloud virtual machine 540. The deployment of the above-mentioned edge service is similar to the deployment of the cloud service shown in FIG. 7.

More specifically, the edge server 53 comprises an edge agent module 532 (may be a studio software module). The edge server 53 and the network apparatus 50 complete the deployment of the edge service by performing the following steps.

Step S500: the network apparatus 50 (namely, the near-end apparatus) connects to the edge server 53 by the public network or the internal network based on the connection information of edge server (such as network address and connection port number, the identification information, key and so forth).

Step S501: the network apparatus 50 builds the edge agent module 532 in the edge server 53.

One of the exemplary embodiments, the edge agent module 532 is a software module and installed in the edge server 53. The installation may be done at the factory or by the user manually uploading an installation program to the edge server 53 for installing the edge agent module 53.

One of the exemplary embodiments the edge agent module 532 is a studio software module. When the edge agent module 532 run, a development environment and a plurality of software tools may be provided to the user for design, development and deploying programs.

Step S502: the network apparatus 50 and an edge server 53 establish the edge synchronization connection, and synchronize by the edge synchronization connection the local data 510 and 520 (from the local apparatuses 51 and 52) to the edge server 53 for making the edge server be stored the local data 533.

Step S503: the edge server 53 selects by the edge agent module 532 all or a part of the local data 533 as the edge data 531.

Step S504: the edge server 53 configures a plurality of edge data flow tasks 530 based on the local data flow tasks 501 associated with a plurality of the selected local data 533, wherein each edge execution result (used for the designated edge data service) generated based on each edge data flow task 530 and each edge data 533 corresponds to each local execution result (used for the designated local data service, the designated local data service is the same as the designated edge data service) generated based on each corresponding local data flow task 501 and local data 510 and 520.

Step S505: the edge server 53 receives an operation of setting edge data flow task (such as receiving by the management apparatus 57), and set a plurality of edge data flow tasks 530 based on the operation. The edge data flow task 530 set in the step S505 is used to process the designated edge data 531 for generating the edge execution result for the designated edge service.

Please be noted that it may be configured as only performing one of the step S504 and the step S505, or performing the step S504 and the step S505, but this specific example is not intended to limit the scope of the present disclosed example.

Thus, the present disclosed example can achieve the deployment of edge service. The user may selectively use the local service at the near-end by the configuration apparatus 58 or use the edge service remotely by operating the management apparatus 57.

Then, the edge server 53 and the cloud virtual machine 540 execute following steps for deploying the cloud service.

Step S506: the edge server 53 connects to the cloud virtual machine 540 based on the connection information of cloud virtual machine.

Step S507: the edge server 53 establishes the c loud agent module 543 in the cloud virtual machine 540.

Step S508: the edge server 53 set a synchronization range. More specifically, the user may input operation of setting synchronization range (by the management apparatus 57 or the configuration apparatus 58) for controlling the edge server 53 to select the edge data and the edge data flow tasks (such as a part of the edge data flow tasks 530 and the associated edge data 531) which the user wants to deploy them to the cloud.

Please be noted that the step S508 is not the necessary step in the present disclosed example. The step S508 may be omitted if the user would like to deploy all of the edge services to the cloud.

Step S509: the edge server 53 and the cloud virtual machine 540 establish a cloud synchronization connection between each other, and continuously synchronize the edge data 531 from the edge server 53 to the cloud virtual machine 540 by the cloud synchronization connection.

One of the exemplary embodiments, if a synchronization range is set, the edge server 53 only synchronizes the selected edge data 531 or the edge data 531 associated with the selected edge data flow task 530.

Step S510: the edge server 53 uploads the edge data flow task 531 to the cloud virtual machine 540.

One of the exemplary embodiments, if a synchronization range is set, the edge server 53 only uploads the selected edge data flow task 530.

Step S511: the cloud virtual machine 540 sets the cloud task program 541 by the cloud agent module 543 based on the received edge data flow task. Each cloud execution result generated based on each cloud task program 541 and the associated cloud structured data 542 respectively corresponds to each edge execution result generated based on each edge data flow task 530 and each edge data 531.

Thus, the present disclosed example can deploy all or partial edge services to the cloud based on the user's demand.

Figure 6:
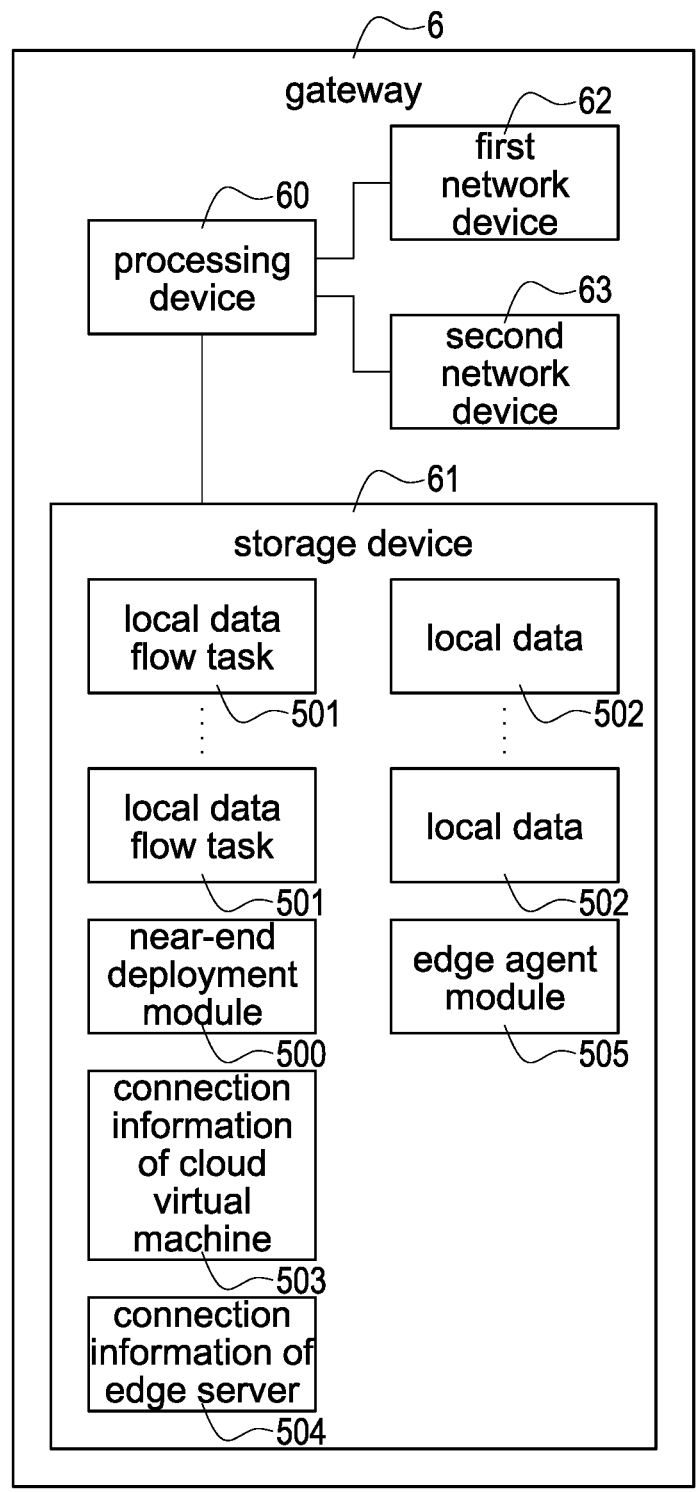
FIG. 6 illustrates an architecture diagram of the network apparatus according to a fifth implement aspect of the present disclosed example.

Please refer to FIG. 6 illustrating an architecture diagram of the network apparatus according to a fifth implement aspect of the present disclosed example. The edge server 53, the network apparatus 50 and 50 or the above-mentioned near-end apparatus may be the gateway 6. The gateway 6 may comprise a first network device 62, a second network device 63, a storage device 61 and a processing device 60 for controlling the gateway 6.

The first network device 62 and the second network device 63 may be the heterogeneous network modules. For example, the first network device 62 may be the Wi-Fi module, ethernet module, mobile network module and so forth, the second network device 63 may be the Bluetooth module, Zigbee module, infrared module and so forth.

One of the exemplary embodiments, the first network device 62 is used to connect to the public network (such as the internet) for connecting to the cloud server. The second network device 63 is used to connect the local devices for retrieving the local data of the local device.

One of the exemplary embodiments, if the network apparatuses 50 and 55 are gateway 6, the storage device 61 may store the local data flow tasks 501, the local data 502, the near-end deployment module 501, the connection information 503 of cloud virtual machine and the connection information 504 of edge server.

One of the exemplary embodiments, if the edge server 53 is gateway 6, the storage device 61 may store connection information 503 of cloud virtual machine and the edge agent module 505.

Thus, the present disclosed example can provide more applications of gateway 6. Moreover, by the arrangement of the edge server 53, the user can deploy the service conveniently and the information security can be improved.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A method for deploying local service of a near-end apparatus in a cloud server, the method comprising following steps:
    a) at the near-end apparatus, connecting to a cloud virtual machine of the cloud server based on connection information of the cloud virtual machine;
    b) building a cloud agent module in the cloud virtual machine;
    c) making the near-end apparatus establish a cloud synchronization connection with the cloud virtual machine, and continuously synchronizing local data in the near-end apparatus to the cloud virtual machine by the cloud synchronization connection;
    d) at the cloud virtual machine, transforming the local data into cloud structured data by the cloud agent module;
    e) uploading at least one local data flow task in the near-end apparatus to the cloud virtual machine; and
    f) at the cloud virtual machine, setting at least one cloud task program based on the at least one local data flow task by the cloud agent module, wherein a cloud execution result generated based on the at least one cloud task program and the cloud structured data corresponds to a local execution result generated based on the local data and the at least one local data flow task,
    wherein each cloud structured data and each cloud task program are associated with identification information of the near-end apparatus; the method of deploying cloud services quickly further comprises following steps:
    k1) establishing a synchronization connection between an incremental near-end apparatus and the cloud virtual machine when the cloud virtual machine is connected to the incremental near-end apparatus, and continuously synchronizing incremental local data in the incremental near-end apparatus to the cloud virtual machine;
    k2) at the cloud virtual machine, transforming the incremental local data into incremental cloud structured data by the cloud agent module;
    k3) updating at least one incremental local data flow task in the incremental near-end apparatus to the cloud virtual machine; and
    k4) at the cloud virtual machine, setting at least one incremental cloud task program based on the at least one incremental local data flow task by the cloud agent module, wherein an incremental cloud execution result generated based on each incremental cloud task program and the corresponding incremental cloud structured data corresponds to an incremental local execution result generated based on the corresponding local data flow task and the corresponding local data; each incremental cloud structured data and each incremental cloud task program are associated with incremental identification information of the incremental near-end apparatus.

2. The method according to claim 1, further comprising following steps:
    g1) establishing a connection between the cloud virtual machine and a management apparatus;
    g2) selecting a plurality of the cloud task programs based on a dashboard instruction when receiving the dashboard instruction from the management apparatus, wherein the cloud task programs are respectively associated with a plurality of the cloud structured data;
    g3) executing the cloud task programs being selected to generate a plurality of the cloud execution results based on the cloud structured data being associated with the cloud task programs; and
    g4) generating dashboard data based on the cloud execution results, and transmitting the dashboard data to the management apparatus for displaying a dashboard interface.

3. The method according to claim 1, further comprising following steps performed before the step a):
    h1) at a user electronic apparatus, logging in the cloud server based on user identification information;
    h2) at the cloud server, building the cloud virtual machine for the user identification information; and
    h3) initializing and setting the cloud virtual machine, and retrieving the connection information of the cloud virtual machine.

4. The method according to claim 1, further comprising following steps:
    i1) uploading the local data being modified and identification information of the near-end apparatus to the cloud virtual machine by the cloud synchronization connection when detecting that the local data in the near-end apparatus is modified;

i2) at the cloud virtual machine, recognizing the cloud structured data corresponding to the identification information of the near-end apparatus by the cloud agent module; and i3) updating the cloud structured data based on the local data being modified.

5. The method according to claim 1, further comprising following steps:

j1) uploading the local data flow task being modified and identification information of the near-end apparatus to the cloud virtual machine when detecting that any of the at least one local data flow task in the near-end apparatus is modified;

j2) at the cloud virtual machine, recognizing the corresponding cloud task program based on the identification information of the near-end apparatus by the cloud agent module; and j3) updating the cloud task program being recognized based on the local data flow task being modified.

6. The method of according to claim 1, further comprising a step 1) disconnecting the cloud synchronization connection and disabling all of the cloud structured data and the cloud task programs associated with the near-end apparatus when detecting that the near-end apparatus is disconnected.

7. The method according to claim 1, wherein the cloud agent module provides web service for executing data-transmitting with the near-end apparatus.

8. The method according to claim 7, wherein the c loud agent module provides the web service by RESTful API.

9. The method according to claim 1, wherein the near-end apparatus is connected to an edge server; the method of deploying cloud services quickly further comprises following steps:

m1) at the near-end apparatus, connecting to the edge server based on connection information of the edge server;

m2) building an edge agent module in the edge server;

m3) establishing an edge synchronization connection between the near-end apparatus and the edge server, and continuously synchronizing a plurality of the local data in the near-end apparatus to the cloud virtual machine by the edge synchronization connection;

m4) at the edge server, selecting a part of a plurality of the local data as a plurality of edge data by the edge agent module;

m5) setting a plurality of edge data flow tasks based on the local data flow tasks associated with the local data being selected in the near-end apparatus or an operation of setting edge data flow task.

10. The method according to claim 9, wherein the edge server is connected to the c loud virtual machine; the method of deploying cloud services quickly further comprises following steps performed after the step m5):

m6) at the edge server, connecting to the cloud virtual machine based on the connection information of the edge server;

m7) at the cloud virtual machine, building the cloud agent module;

m8) establishing the cloud synchronization connection between the edge server and the cloud virtual machine, and continuously synchronizing a plurality of the edge data in the edge server to the cloud virtual machine by the cloud synchronization connection;

m9) uploading the edge data flow tasks in the edge server to the cloud virtual machine; and m10) at the cloud virtual machine, setting the cloud task programs based on the edge data flow tasks by the cloud agent module, wherein each cloud execution result generated based on each cloud task program and the corresponding cloud structured data corresponds to each edge execution result generated based on each edge data flow task and the corresponding edge data.

11. The method according to claim 10, further comprising following step performed before the step m8): m11) selecting a part of the edge data or a part of the edge data flow tasks based on an operation of setting synchronization range;

the step m8) is performed to synchronizing the edge data being selected or the edge data associated with the edge data flow tasks by the cloud synchronization connection continuously;

the step m9) is performed to uploading the edge data flow tasks being selected.

12. The method according to claim 9, wherein at least one of the edge server and the near-end apparatus is a gateway.

13. The method according to claim 9, wherein at least one of the edge agent module and the cloud agent module is a studio software module.

14. The method according to claim 1, wherein the local apparatus comprises a network apparatus and at least one local apparatus; the at least one local data flow task is stored in the network apparatus, the local data is stored in the at least one local apparatus, and the network apparatus is used to connect the at least one local apparatus and the cloud virtual machine;

the step c) is performed to forward the local data from the at least one local apparatus through the network apparatus to the cloud virtual machine;

the step e) is performed to uploading the at least one local data flow task in the network apparatus to the c loud virtual machine.

* * * * *